Nov. 27, 1962 T. C. EDWARDS 3,065,855
COOKING UTENSIL

Filed June 6, 1960 2 Sheets-Sheet 1

INVENTOR.
THOMAS C. EDWARDS
BY
ATTORNEY

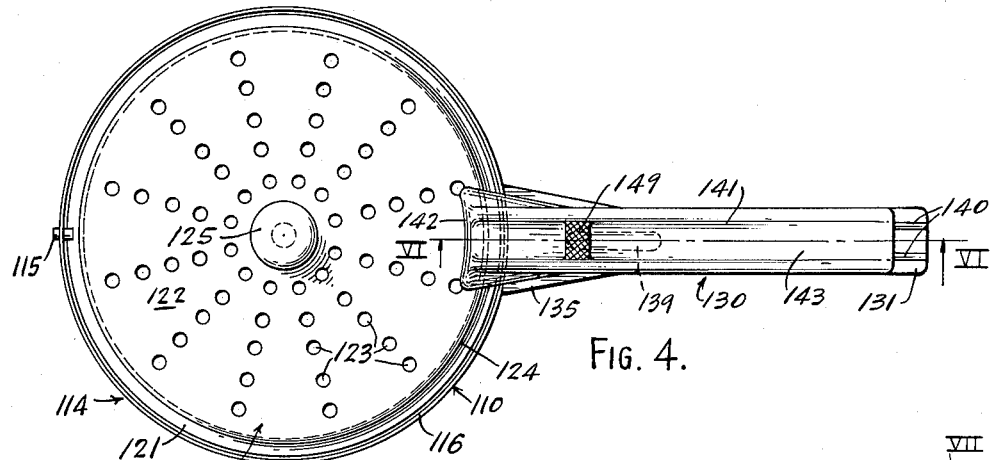
FIG. 4.
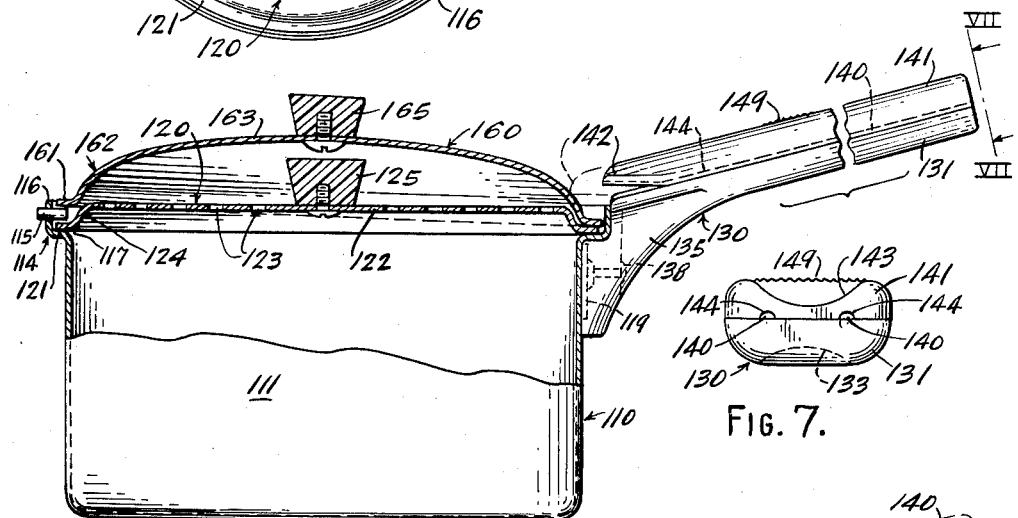
FIG. 5.
FIG. 7.
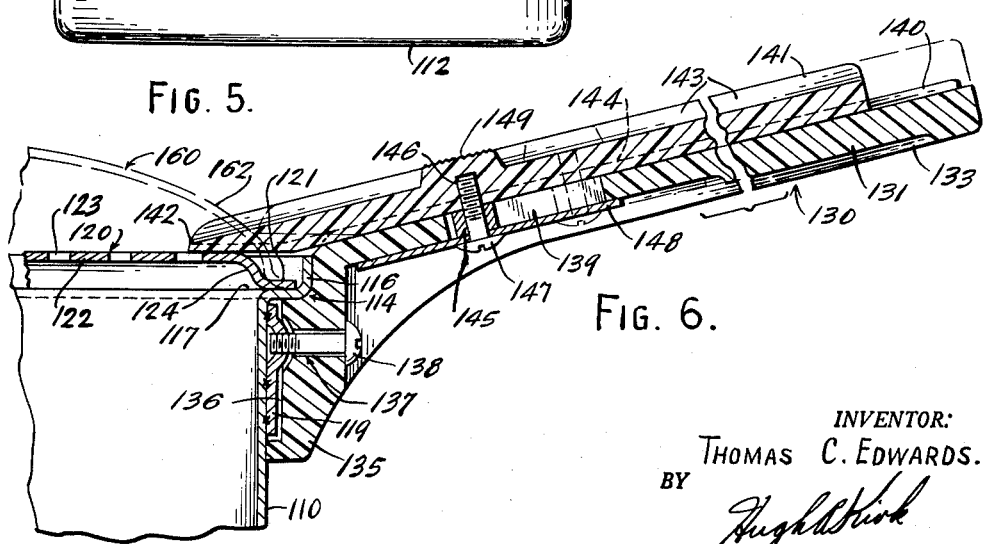
FIG. 6.
INVENTOR:
THOMAS C. EDWARDS.
BY
ATT'Y.

United States Patent Office 3,065,855
Patented Nov. 27, 1962

3,065,855
COOKING UTENSIL
Thomas C. Edwards, 1847 S. Shore Drive, Oregon, Ohio
Filed June 6, 1960, Ser. No. 34,096
3 Claims. (Cl. 210—469)

This invention relates to a cooking utensil with a handle and a cover. More particularly, it deals with a cooking vessel or pot having a separate foraminous cover which may be removably locked in place by means on the handle for draining the liquids from foods cooked in the vessel, such as water from vegetables or cereals, including potatoes, rice, macaroni, spaghetti, and the like.

This invention is a continuation-in-part of copending U.S. patent application Serial No. 696,812 filed November 15, 1957 and now abandoned of Thomas C. Edwards.

It is an object of this invention to produce a simple, efficient, effective, economic and sanitary cooking vessel with a separable foraminous cover for draining liquids from foods cooked in the vessel.

It is another object of this invention to provide such a a vessel with means for clamping the foraminous cover sufficiently tightly thereon so that all of the liquids from the food cooked in the vessel may be quickly drained off while the food is still hot by completely inverting the vessel, and also even to hold the foods in the vessel while the vessel is shaken while so inverted to insure that all the liquids are removed from between the particles or pieces of food in the vessel so that the heat in the food will further vaporize for removal any liquids remaining on and around the food.

Another object is to produce a vessel having a means on the handle of such a vessel for removably clamping such a separable foraminous cover on the vessel.

Another object is to provide a separate continuous or closing cover for such a vessel which may be used in place of or together with the foraminous cover, which closing lid or cover cannot be tightly clamped to the vessel to permit pressure to build up in the vessel during the cooking of food and/or boiling of liquids therein.

Generally speaking, this invention comprises a cooking utensil comprising a pot having a rim, a handle attached to the pot adjacent the rim, and a separate cover for the pot seatable on the rim of the vessel. Opposite the handle on the rim of the pot or vessel there is located a hook or stop member which extends inwardly of the vessel and under which the edge of the cover may be inserted to hold that side of the cover in place on the rim of the vessel. The handle extends longitudinally outwardly and slightly upwardly from one side of the vessel adjacent the rim, which handle is composed of two portions, one portion being rigidly attached at its end to the side of the vessel adjacent the rim, and the other portion being longitudinally slidable relative to said one portion so that its end adjacent the vessel may be projected over the edge of the rim of the vessel to clampingly engage the foraminous cover placed on the rim of the vessel.

The vessel or pot may have cylindrical sides, a flat bottom, and an open top with a flanged rim which also may be offset to provide a seat for the peripheral edge of a cover, and/or the foraminous cover may have an offset flanged periphery which seats inside the rim of the vessel or on the offset of said rim, to provide a nesting fit between the foraminous cover and vessel to prevent the foraminous cover from moving laterally with respect to the rim so that only the hook or stop and slidable cover engaging portion of the handle can clamp the foraminous cover to the rim of the vessel.

The two portions of the handle are preferably connected together and guided and limited in their relative sliding movement so that dirt will not easily accumulate between the two movable parts, and if such does occur the parts may be relatively easily disassembled for cleaning. Such a construction may comprise a cooperating groove and rib longitudinal of the handle portions for guiding their sliding movement, and a stud and slot for limiting their relative movement, as well as holding the two portions together. Even a resilient spring cover for the open side of the slot may be provided for preventing dirt from accumulating in the slot and further frictionally urging the two portions together. The handle is preferably also manufactured of a low heat conducting or heat insulating material as wood or plastic, as distinguished from the vessel which usually is made of a high heat conducting material as copper, stainless steel or aluminum.

In addition to the foraminous cover held in place by the slidable portion of the handle and the stop there may be provided a continuous or solid dome shaped lid or cover for the vessel which may be used in addition to or in place of the foraminous cover, but which is so constructed that it cannot be clamped onto or against the rim of the vessel as the foraminous cover, but at best can only be loosely held thereon by the slidable portion of the handle and/or stop. Either or both of the covers for the vessel may have centrally located thereof handles or knobs preferably also of a low heat conductive material.

The above mentioned and other features and objects of this invention and the manner of attaining them will become more apparent and the invention itself will be understood best by reference to the following description of embodiments of this invention taken in conjunction with the accompanying drawings, wherein:

FIG. 1 in a plan view of one embodiment of a utensil of this invention with the foraminous cover clamped or locked in place thereon;

FIG. 4 is a top plan view of another and improved embodiment of the utensil of this invention with the foraminous cover locked in position thereon;

FIG. 5 is a side elevation of the vessel shown in FIG. 4 with parts broken away and with a continuous cover or lid located on the vessel over the foraminoos cover, showing the relationships of said covers to the stop for holding the foraminoos cover opposite the handle;

FIG. 6 is an enlarged sectional view taken along line VI—VI of FIG. 4 with most of the vessel and foraminous cover being broken away, and showing the means for holding and limiting the relative slidable movement of the two portions of the handle, and the attachment of the handle to the vessel; and FIG. 7 is an end view of the handle taken in the direction of the arrows VII—VII in FIG. 5 showing another embodiment of the cooperating guiding ribs and grooves longitudinal of the relative slidable portions of the handle.

Figure 1:
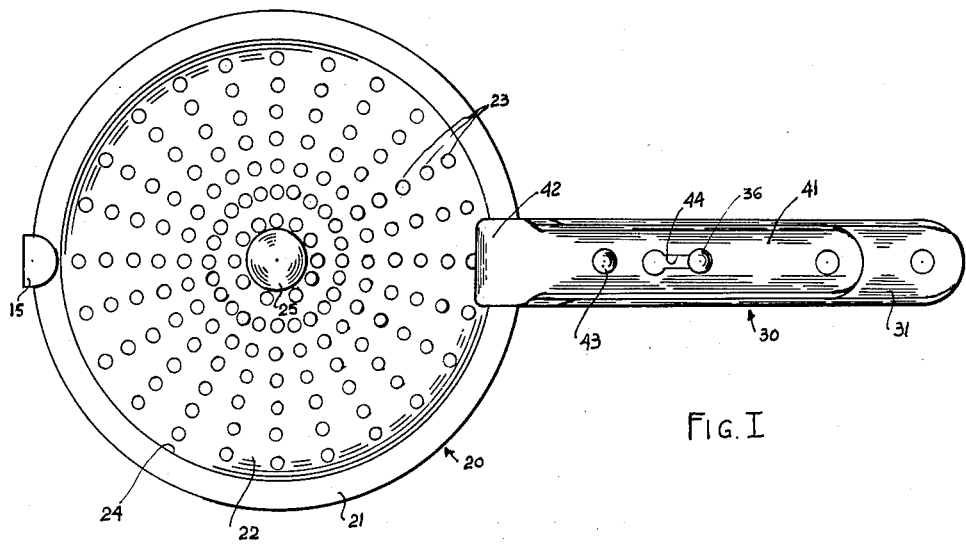
Figure 2:
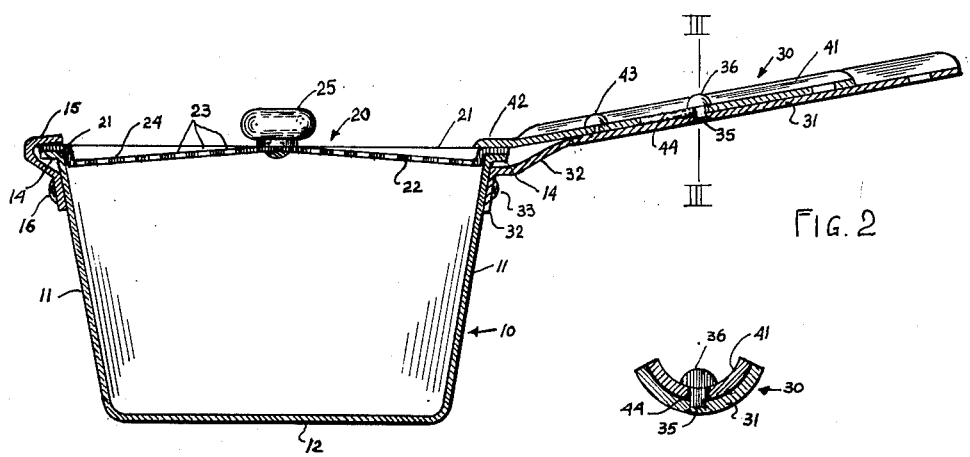
FIG. 2 is a vertical section taken along line II—II of FIG. 1.
Figure 3:
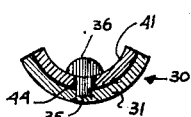
FIG. 3 is a cross-section of the handle taken along line III—III of FIG. 2 showing the cooperating guiding configuration of the two portions of the handle.

Referring first to the embodiment shown in FIGS. 1 through 3, the utensil of this invention comprises a vessel or pot 10 which may have frusto conical side walls 11, a flat bottom 12 and an upper outwardly flanged rim 14 upon which may reside a foraminous or perforated disk cover 20 having a peripheral offset flanged edge 21. On one side of the vessel 10 there may be provided a single inwardly extending and rim overhanging hook or stop member 15 which may be attached by welding or rivets 16 to the side 11 of the vessel below the rim 14. Diametrically opposite the hook member 15 there may be provided an outwardly and slightly upwardly extending handle 30, one or the lower portion 31 of which may have an offset flanged end 32 which conforms to the outer surface of the side wall 11 and flanged rim 14, and is attached to the wall 11 by welding or rivets 33 just below the rim 14.

On the cover 20 between its central disk portion 22 having a plurality of liquid draining apertures, holes or perforations 23 and the flange rim 21 is an offset portion 24 which is formed to fit within the upper cylindrical edge of the walls 11 of the vessel 10 so that the cover 20 seats in and on the top flange rim 14 of the pot 10 and its flange 21 fits relatively snugly underneath the stop or hook member 15 which is spaced above the flange rim 15 just sufficient for the easy insertion of the cover flange 21. The center of the foraminous cover 20 may be provided with a knob or handle 25 which may be formed integral, welded to or attached by means of a screw 26 to the cover 20.

Longitudinally slidable and nested in the concave upper surface of the uniform arcuate cross-section of lower handle portion 31 rigidly attached to the vessel 10, may be an upper or other handle portion 41, also of uniform arcuate cross-section. The forward end 42 of this slidable portion 41 may be flattened for inwardly and slightly downwardly clamping the flange 21 of the cover 20 due to the downward slope of the handle 30 toward the vessel 10. Thus when the portion 41 and its end 42 are in the position shown in FIGS. 1 and 2, the foraminous cover is securely held onto the rim 14 of the vessel 10 so that when the food in the vessel 10 is to have the liquid therein drained, the vessel may be completely inverted and the seated cover 20 will not fall off, because of the clamping action of the end 42 and the retention of the hook or stop member 15 on opposite sides of the rim 14. Also, the vessel 10 may even be shaken to be sure that all of the liquid is removed from around the pieces of the food in the vessel 10 without loosening of the cover 20, which may be further insured by the hand or thumb of the operator or cook pressing inwardly on the upper handle portion 41. There also may be provided on the upper slidable movable handle portion 41, an upwardly projecting thumb engaging member or rivet head 43 to aid in longitudinal moving or sliding the upper handle portion 41 along the lower handle portion 31.

The two handle portions 31 and 41 may be held together and limited in their relative slidable movements by a stud, pin or rivet 35 fixed to and extending outwardly from one of the handle portions, herein portion 31, moving in a key-hole slot 44 in the other handle portion; herein portion 41. This stud or rivet may have a head portion 36 spaced above the slidable contacting or co-operating surfaces of the handle portions 31 and 41 slightly greater than the thickness of that portion, herein other or upper portion 41 (see FIG. 3) to retain the two portions 31 and 41 together. The key-hole slot 44 in other or upper portion 41 and in which the spaced neck of rivet 35 below the head 36 slides, then limits the longitudinal slidable movement of the upper handle portion 41 relative to the lower or fixed handle portion 31, so that the end 42 of the portion 41 may, at the will of the operator or cook, be projected into and out of clamping engagement with the flange 21 of the cover 20 for holding or locking and removing the cover 20 to or on and from the vessel or pot 10, respectively. If the upper handle portion 41 is slid back to its outward limiting position, that is away from the pot 10 so that the enlarged portion of the key-hole slot 44 is over the head 36 of the stud 35, the slidable portion 41 may then be removed for cleaning and/or the vessel 10 may then be used as an ordinary saucepan or cooking vessel. Furthermore, if desired, any lid or continuous cover may be employed on the vessel 10 as would be on any such saucepan.

Referring now specifically to the improved embodiment of this invention shown in FIGS. 4 through 7, there is shown a vessel or pot 110 which may have cylindrical sides 111 and bottom 112 and upper rim 114 which may comprise an offset flange 116 providing the seat 117 for receiving the peripheral edges of the covers 120 and 160 for the vessel 110. On one side of the rim 114 of the vessel diametrically opposite the handle may be provided an inwardly projecting stop or hook member 115 which overhangs the seat 117 of the rim 114 and is spaced sufficiently above the seat 117 for receiving the peripheral edge of either the foraminous cover 120 or continuous lid 160, but not both as is shown in FIG. 5 and will be described later. The stop 115 may comprise a stud or rivet located in the flange portion 116 of the rim 114. Diametrically opposite the stop 115 there may be provided a tapped handle connecting plate or boss 119 (see FIG. 6) integral or welded to the side 111 of the vessel below the rim 114, to which boss 119 the flanged end of the lower or stationary portion 131 of the outwardly and upwardly extending handle 130 may be rigidly attached to the vessel 110.

Covering the open upper end of the pot or vessel 110 there is provided a foraminous cover 120 which may comprise a circular disk or plate having an offset peripheral flange 121 which is engageable under the stop 115 and on the seat 117 of the rim 114 of the pot 110. The space between the stop 115 and seat 117 is just sufficient for the peripheral edge 121 of the foraminous or perforated metal disk cover 120 to fit easily therebetween, but not sufficient to permit such looseness that any of the food particles in the vessel, such as rice, can lodge therebetween when the vessel is inverted for draining. The central disk portion 122 of the cover 120 may be raised from the peripheral rim 121 so as to be positively engaged by the forward end 142 of the upper handle section 141 as shown in FIG. 6, so that the peripheral rim 121 will be downwardly urged and locked against the seat 117 of the rim 114 during the draining and shaking of the vessel 110 to insure that food remains in the vessel when it is inverted and shaken. The liquids in the vessel are thus removed from the food contents in the vessel primarily through the many holes or apertures 123 provided in the cover 120 for the escape of such liquids. If desired, the central portion 122 offset at 124 from the flanged peripheral edge 121, may be provided with a handle or knob 125 by which the foraminous cover 120 may be readily placed and removed from the vessel at will, which handle 125 is preferably made out of a relatively low heat conducting material, such as wood or plastic, so as not to irritate the hands of the user, if the vessel 110 and cover 120 is hot, which is one of the important features of this invention, in that the drainage of the food may be performed while the food is still hot and taken immediately from the stove, so that the heat in the food will help to vaporize any of the liquids remaining in the vessel after they are drained off and the vessel is shaken.

Referring now to the handle 130 and the lower or stationary and upper or slidable portions 131 and 141 thereof, respectively, these portions are also preferably made of low heat conducting material, such as wood or plastic. The handle 130 may be formed to conveniently fit the hand of the user, such as having concave portions 133 and 143 in its lower and upper faces longitudinally of the handle, and an enlarged flanged end portion 135 adjacent the vessel which may be formed to fit the cylindrical side 111 and rim 114 of the vessel 110 and be provided with a recessed portion 136 (see FIG. 6) into which the tapped plate 119 fits. Through the central portion of this enlarged flange portion 135 there may be provided an aperture 137 through which a fastening means, such as a machine screw 138 may be threaded into the tapped boss 119 for removably but rigidly attaching a handle 130 to the vessel 110. Between the ends of the handle portion 131 there is also provided a longitudinal slot 139 for connecting and limiting the relative slidable movement of the upper handle portion 141 and reception of the stud 145 described below. Along the top or slide engaging surface of the lower handle portion 131 there may be provided a pair of ribs 140 for guiding the relatively longitudinal sliding movement of the upper portion 141 of the handle as better seen in FIG. 7.

Referring now to the upper portion 141 of the handle 130 which slidably cooperates with the lower portion 131, the lower or cooperating sliding surface of the upper portion 141 contains longitudinal grooves 144 which straddle the ribs 140, however, the grooves and ribs may be interchanged on the different parts 131 and 141 without departing from the scope of this invention, or other longitudinal configurations may be employed between the two members for guiding purposes, including side flanges, if desired. Opposite the slot 139 a stud portion 145 is provided which may be formed integral with the handle portion 141. This stud 145 extends through the slot 139 and is limited in its longitudinal movement therein to correspond with the two different limiting positions of the handle portion 141 relative to the handle portion 131 as shown in FIGS. 4 and 5, or in full and dotted lines in FIG. 6. The center of this stud 145 may be provided with a tapped threaded aperture 146 into which may be threaded a headed screw 147 or other fastening means to straddle the slot 139 removably to hold the two handle portions 131 and 141 together. A cover plate 148 may be inserted under the head of screw 147, which plate 148 may be made of resilient spring steel, and also be sufficiently large to completely cover the open side of the slot 139 in all positions of movement of the stud 145 to prevent dirt from entering the slot 139. This plate 148 also engages the under side of the handle portion 131 within the recess 133 to further hold the two handle portions together and the guiding ribs 140 in the guiding grooves 144. The forward end 142 of the upper handle portion 141 may be broader than the normal width of the handle 130 to form a greater and better clamping or downwardly pressing contact on the top surface of the disk portion 122 of the perforated cover 120, as shown in FIGS. 4 and 6, so that the downward slope of the handle 130 and corresponding downward movement of the slidable portion 141 aids in positively pressing or locking the cover 120 in place, so that its flange 21 engages firmly the seat 117 of the rim 114 of the pot 110. On the top of the upper handle portion 141, such as opposite the stud 145, there may be provided a roughened, knurled portion 149 bridging the recess 143 and acting as a thumb engaging stop or member to facilitate forward and backward sliding movement of the upper handle portion 141 by the operator or cook when the vessel handle 130 is held in his or her hand.

If desired, an additional continuous or solid cover or lid 160 may be provided for the vessel (see FIG. 5), which may have a peripheral flange edge 161 that also may fit within the flange 116 of the vessel 110 and may rest on the seat 117, provided the foraminous cover 120 is not on the vessel 110. However, the flange 161 of the lid 160 is sufficiently offset at 162 (see also in dotted lines in FIG. 6) so that the end 142 of the upper handle portion 141 cannot press or clamp down upon the top or even the flange 161 of the lid 160 to lock its peripheral edge 161 against seat 117 which might cause a dangerous pressure to be produced in the vessel 110. Thus the forward end 142 of the handle portion 141 may only loosely hold the lid 160 thereon, as shown in dotted line position in FIG. 6. The central portion of the lid 160 may be provided with a low heat conductive central handle or knob 165, similar to the handle knob 125, and its dome portion 163 may be sufficiently high to provide ample space for the handle 125 on the cover 120, as shown in FIG. 5, so that both covers 120 and 160 may be placed on the vessel 110 at the same time, but the lid 160 cannot be clamped against the rim of the vessel so as to dangerously produce pressure within the vessel, since only one peripheral edge flange of one cover 120 or 130 can fit under the stop 115 at a time (see FIG. 5) although both covers may reside substantially within the flange portion 116 of the rim 114 to provide a lid, if desired, for the foraminous cover 120 while the food in the vessel 110 is being cooked.

Thus the vessel 110 may be used without the foraminous cover 120 as a common ordinary cooking vessel or saucepan and the upper handle portion 141 may be retracted and held in position shown in FIG. 5. However, if the vessel 110 is to be used for cooking and draining vegetables or food while still hot in the vessel, the lid 160 is removed and the foraminous cover 120 is clamped in position by moving the upper handle portion 141 forward by the thumb of the operator pressing against the member 149 into the position shown in full lines in FIGS. 4 and 6, so that the vessel 110 may be lifted from the stove or heater, inverted over a sink or basin to drain all the liquid therefrom, and then shaken to be sure that all of the liquid among the particles of the food in the vessel is completely removed, and the heat inherent in the food vaporizes any liquids which may still be retained therein to produce a drier food that is not soggy. Soggy foods are often produced by just draining or pouring the liquid off from them since the shaking action permitted by this invention is not usually possible.

It is to be clearly understood that the different forms of vessels or pots shown in the two embodiments of this invention as well as other forms not shown may be employed herein without departing from the scope of this invention, and also other type rims and cover flanges for seating the covers on the rims of such vessels. Furthermore, any type of foraminous cover such as a screen with a clampable peripheral edging may be employed provided it has sufficient rigidity so as to be held in snug engagement with the top rim of the vessel by the two diametrically opposite holding means, namely the stop means and end of the slidable handle portion. Also parts of one embodiment may be interchanged with parts having similar functions in the other embodiment disclosed without departing from the scope of this invention.

While there is described above the principles of this invention in connection with specific apparatus, it is to be clearly understood that this description is made only by way of example and not as a limitation to the scope of this invention.

What is claimed is:

1. A cooking and draining vessel comprising:

(A) a pot having:
 (1) an offset rim forming a seat, and
 (2) a retainer projecting inwardly of the periphery of said rim and spaced above said seat to overhang a small part of said seat;

(B) a separable and removable foraminous cover for said pot having:
 (1) a peripheral edge portion for resting within said rim and on said seat and loosely in said space between said retainer and said seat, and
 (2) a knob for manually locating said cover on said seat with a part of said edge portion under said retainer to hold the adjacent side of said cover adjacent said seat;

(C) a separable and removable lid for said pot having:
 (1) a peripheral edge portion for resting on said seat and loosely in said space between said retainer and said space, and
 (2) a knob for manually locating said lid on said seat with its said edge portion under said retainer to hold the adjacent side of said lid adjacent said seat in the same manner as and instead of said cover, and for locating said lid on said edge of said cover within said rim and over said retainer when both said cover and said lid are employed since said space between said retainer and said seat is insufficient for both said edges of said cover and said lid at the same time; and (D) a handle on the opposite side of said pot from said retainer, having:

(1) a lower member attached at one end to the side of said pot adjacent said rim, and
(2) an upper member longitudinally slidable along said lower member and over said seat, whereby said upper member when extended over said seat and said edge of said cover or said lid releasably holds, together with said retainer, said cover or said lid on said pot, but does not hold both said cover and said lid thereon at the same time.

2. A cooking and draining vessel comprising:
(A) a pot having:
(1) a rim forming a seat, and
(2) a retainer projecting inwardly of the periphery of said rim and spaced above said seat to overhang a small part of said seat;
(B) a separable and removable foraminous cover for said pot having:
(1) a peripheral edge portion for resting on said seat in said space between said retainer and said seat, and
(2) a knob for manually locating said cover on said seat with a part of said edge portion under said retainer to hold the adjacent side of said cover adjacent said seat; and
(C) a handle of low heat conducting material on the opposite side of said pot from said retainer having:
(1) a lower member attached at one end to the side of said pot adjacent said rim,
(2) an upper member longitudinally slidable along said lower member and over said seat,
(3) a longitudinal rib on one of said members nesting in a longitudinal channel in the other of said members for guiding the sliding movement of the upper member along said lower member,
(4) a longitudinal slot in one of said members,
(5) a stud attached to the other of said members and extending through said slot, and
(6) resilient plate means on the outer end of said stud to hold said members together and to cover said slot whereby said rib and channel are held in nesting engagement, and whereby said slot and said stud limit the longitudinal movement of said upper member, and said upper member is extendable over said seat adjacent the rim of said pot and over said edge of said cover to releasably hold, together with said retainer, said cover on said pot.

3. A cooking and draining vessel comprising:
(A) a pot having:
(1) an offset rim forming a seat, and
(2) a retainer projecting inwardly of the periphery of said rim and spaced above said seat to overhang a small part of said seat;
(B) a separable and removable foraminous cover for said pot having:

(1) a peripheral edge portion for resting within said rim and on said seat and loosely in said space between said retainer and said seat, and
(2) a knob for manually locating said cover on said seat with a part of said edge portion under said retainer to hold the adjacent side of said cover adjacent said seat;
(C) a separable and removable lid for said pot having:
(1) a peripheral edge portion for resting on said seat and loosely in said space between said retainer and said space, and
(2) a knob for manually locating said lid on said seat with its said edge portion under said retainer to hold the adjacent side of said lid adjacent said seat in the same manner as and instead of said cover, and for locating said lid on said edge of said cover within said rim and over said retainer when both said cover and said lid are employed since said space between said retainer and said seat is insufficient for both said edges of said cover and said lid at the same time; and
(D) a handle of low heat conducting material on the opposite side of said pot from said retainer, having:
(1) a lower member attached at one end to the side of said pot adjacent said rim,
(2) an upper member longitudinally slidable along said lower member and over said seat,
(3) a longitudinal rib on one of said members nesting in a longitudinal channel in the other of said members for guiding the sliding movement of the upper member along said lower member,
(4) a longitudinal slot in one of said members,
(5) a stud attached to the other of said members and extending through said slot, and
(6) resilient plate means on the outer end of said stud to hold said members together and to cover said slot whereby said rib and channel are held in nesting engagement, and whereby said slot and stud limit the longitudinal movement of said upper member, and said upper member is extendable over said seat adjacent the rim of said pot and over said edge of said cover or said lid to releasably hold, together with said retainer, said cover or said lid on said pot, but not to hold both said cover and said lid thereon at the same time.

References Cited in the file of this patent

UNITED STATES PATENTS

| | | |
|---|---|---|
| Re. 21,688 | Van Ness | Jan. 7, 1941 |
| 1,055,072 | Pearl | Mar. 4, 1913 |
| 2,093,658 | Hildenbrand | Sept. 21, 1937 |
| 2,802,688 | Peabody | Aug. 13, 1957 |

FOREIGN PATENTS

| | | |
|---|---|---|
| 326,933 | Great Britain | Mar. 27, 1930 |